US005995898A

United States Patent [19]

Tuttle

[11] Patent Number: 5,995,898

[45] **Date of Patent: *Nov. 30, 1999**

[54] RFID SYSTEM IN COMMUNICATION WITH VEHICLE ON-BOARD COMPUTER

[75] Inventor: John R. Tuttle, Boise, Id.

[73] Assignee: Micron Communication, Inc., Boise, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,737

[22] Filed: Dec. 6, 1996

[51] Int. Cl.[6] .......... G06F 13/00

[52] U.S. Cl. .......... 701/102

[58] Field of Search .......... 701/102, 114; 379/58; 395/615; 340/426, 522, 431; 380/25; 370/347; 455/426, 13.1; 364/431.04, 424.04, 431.12, 424.034, 900, 431.11; 342/42; 371/29

[56] References Cited

U.S. PATENT DOCUMENTS

| | | | |
|---|---|---|---|
| 4,072,850 | 2/1978 | McGlynn | 701/35 |
| 4,075,632 | 2/1978 | Baldwin et al. | 343/6.8 |
| 4,168,679 | 9/1979 | Ikeura et al. | 123/32 |
| 4,237,830 | 12/1980 | Stivender | 123/493 |
| 4,335,695 | 6/1982 | Phipps | 123/478 |
| 4,398,172 | 8/1983 | Carroll et al. | 340/38 |
| 4,497,057 | 1/1985 | Kato et al. | 371/29 |
| 4,524,745 | 6/1985 | Tominari et al. | 123/478 |
| 4,551,803 | 11/1985 | Hosaka et al. | 701/115 |
| 4,552,116 | 11/1985 | Kuroiwa et al. | 123/489 |
| 4,714,925 | 12/1987 | Bartlett | 340/825.55 |
| 4,728,922 | 3/1988 | Christen et al. | 340/991 |
| 4,843,557 | 6/1989 | Ina et al. | 364/431.11 |

(List continued on next page.)

FOREIGN PATENT DOCUMENTS

| | | |
|---|---|---|
| 0 456 425 | 5/1991 | European Pat. Off. . |
| 0 725 377 | 8/1996 | European Pat. Off. . |
| 2 647 930 | 6/1989 | France . |
| 3445668 | 12/1984 | Germany . |
| 2 169 173 | 7/1986 | United Kingdom . |
| 2277844 | 11/1994 | United Kingdom . |
| WO 90/12365 | 10/1990 | WIPO . |
| WO 91/18452 | 11/1991 | WIPO . |
| WO 93/04353 | 3/1993 | WIPO . |
| WO 94/07206 | 3/1994 | WIPO . |
| WO 95/01607 | 1/1995 | WIPO . |

*Primary Examiner*—Willis R. Wolfe
*Assistant Examiner*—Hieu T. Vo
*Attorney, Agent, or Firm*—Wells, St. John, Roberts, Gregory & Matkin, P.S.

[57] ABSTRACT

A system comprising a vehicle on-board computer; and a wireless transponder device coupled to the vehicle on-board computer. The system performs a variety of functions because of its ability to transmit and receive data from other transponders which may be remote from the vehicle or located in the vehicle at a location spaced apart from the system. Remote transponders are spaced apart from the vehicle. The remote transponders can be positioned, for example, at a gas station, toll booth, service center, dealership, parking lot, or along a roadside.

31 Claims, 4 Drawing Sheets

U.S. PATENT DOCUMENTS

| | | | |
|---|---|---|---|
| 4,853,850 | 8/1989 | Krass, Jr. et al. | 364/200 |
| 4,875,391 | 10/1989 | Leising et al. | 74/866 |
| 4,878,050 | 10/1989 | Kelley | 340/825.06 |
| 4,908,792 | 3/1990 | Przybyla et al. | 364/900 |
| 4,926,182 | 5/1990 | Ohta et al. | 342/44 |
| 4,986,229 | 1/1991 | Suzuki et al. | 123/179 |
| 5,002,031 | 3/1991 | Kako | 123/486 |
| 5,019,799 | 5/1991 | Oshiage et al. | 340/438 |
| 5,054,569 | 10/1991 | Scott et al. | 340/825.54 |
| 5,058,044 | 10/1991 | Stewart et al. | 340/825.54 |
| 5,091,858 | 2/1992 | Paielli | 364/431.12 |
| 5,113,427 | 5/1992 | Ryoichi et al. | 340/825.44 |
| 5,150,609 | 9/1992 | Ebner et al. | 73/117.3 |
| 5,189,612 | 2/1993 | Lemercier et al. | 364/424.02 |
| 5,278,759 | 1/1994 | Berra et al. | 364/424.01 |
| 5,289,369 | 2/1994 | Hirshberg | 340/825.34 |
| 5,345,902 | 9/1994 | Kalail, Sr. et al. | 123/198 B |
| 5,379,042 | 1/1995 | Henoch | 340/825.54 |
| 5,420,794 | 5/1995 | James | 701/117 |
| 5,459,660 | 10/1995 | Berra | 364/424.03 |
| 5,586,034 | 12/1996 | Takaba et al. | 364/431.04 |
| 5,598,898 | 2/1997 | Mutoh et al. | 180/287 |
| 5,606,306 | 2/1997 | Mutoh et al. | 340/426 |
| 5,610,574 | 3/1997 | Motoh et al. | 340/426 |
| 5,619,412 | 4/1997 | Hapka | 701/112 |
| 5,621,380 | 4/1997 | Mutoh et al. | 340/426 |
| 5,621,381 | 4/1997 | Kawachi et al. | 340/426 |
| 5,621,412 | 4/1997 | Sharpe et al. | 342/51 |
| 5,631,501 | 5/1997 | Kubota et al. | 307/10.5 |
| 5,634,190 | 5/1997 | Wiedman | 455/13.1 |
| 5,635,693 | 6/1997 | Benson et al. | 340/825.54 |
| 5,649,296 | 7/1997 | MacLellan et al. | 455/38.2 |
| 5,664,113 | 9/1997 | Worger et al. | 705/28 |
| 5,677,667 | 10/1997 | Lesesky et al. | 340/431 |
| 5,686,920 | 11/1997 | Hurta et al. | 342/42 |
| 5,710,703 | 1/1998 | Kirn et al. | 364/424.034 |
| 5,712,899 | 1/1998 | Pace, II | 379/58 |
| 5,717,830 | 2/1998 | Sigler et al. | 455/426 |
| 5,719,550 | 2/1998 | Bloch et al. | 340/426 |
| 5,721,678 | 2/1998 | Widl | 364/424.04 |
| 5,724,426 | 3/1998 | Rosenow et al. | 380/25 |
| 5,726,630 | 3/1998 | Marsh et al. | 340/572 |
| 5,729,538 | 3/1998 | Dent | 370/347 |
| 5,729,740 | 3/1998 | Tsumura | 395/615 |
| 5,749,984 | 5/1998 | Frey et al. | 340/444 |
| 5,769,051 | 6/1998 | Bayron et al. | 123/335 |
| 5,803,043 | 9/1998 | Bayron et al. | 123/335 |

RFID SYSTEM IN COMMUNICATION WITH VEHICLE ON-BOARD COMPUTER

TECHNICAL FIELD

The invention relates to on-board vehicle computer systems and to radio frequency identification devices.

BACKGROUND OF THE INVENTION

On-board vehicle computer systems are known in the art. Such systems monitor and control operations of mechanical vehicle systems, including vehicle engine systems, transmission systems, brake systems, suspension systems, and display systems. On-board computer systems receive information from various sensors, such as engine speed sensors, manifold pressure sensors, etc. The on-board computer systems can control systems such as by controlling mixture, fluid flow, etc., by controlling electronic systems, or by controlling solenoid-actuated valves that regulate flow of hydraulic fluid. One such computerized vehicle system is described in U.S. Pat. No. 4,875,391 to Leising et al. (incorporated by reference). A system for interfacing with a vehicle computer is disclosed in U.S. Pat. No. 5,459,660 to Berra (incorporated by reference); and a system for reprogramming vehicle computers is disclosed in U.S. Pat. No. 5,278,759 to Berra et al. (incorporated by reference). German Patent Document DE 35 40 599 Al discloses an on-board vehicle computer having a display system that is arranged in an instrument cluster of a dashboard of a vehicle. An on-board computer for a motor vehicle is also disclosed in U.S. Pat. No. 5,150,690 to Ebner et al. (incorporated by reference).

Many vehicles employ several separate microprocessor based computer systems which cooperate with one another. On-board communications systems typically include data busses to enable data communication between such vehicle computer systems. Such data bus technology is disclosed in U.S. Pat. Nos 4,706,082; 4,719,458; 4,739,323; 4,739,324; and 4,742,349 (all of which are incorporated by reference). Such communications systems may employ multiplexing so that simple wire harnesses can be employed for data transmission. In many vehicles, direct access may be provided to monitored data on a real time basis, so that display tools and engine analyzers may be used to perform a more complete diagnosis of engine problems than can be performed by on-board computers. For example, a data terminal connected to an input/output port of the vehicle computer or to an electronic control module may be provided under a dashboard, as described in U.S. Pat. No. 4,853,850 to Krass, Jr. et al. (incorporated by reference).

Because of heavy reliance on on-board computer systems, vehicles presently sold in the United States provide a standardized diagnostic interface according to a "OBDII/CARB" standards requirement. The OBDII/CARB requirement offers a choice between a J1850 specification and an ISO9141 (International Standards Organization) specification. The OBDII requirement, the J1850 standard, and the ISO9141 specification are incorporated herein by reference.

It is also known to use hand held display tools to display code values generated by vehicle computers. Such hand held display tools are described in U.S. Pat. No. 4,602,127 to Neely et al.

SUMMARY OF THE INVENTION

A system comprising a vehicle on-board computer; and a wireless transponder device coupled to the vehicle on-board computer. The system performs a variety of functions because of its ability to transmit and receive data from other transponders which may be remote from the vehicle or located in the vehicle at a location spaced apart from the system. Remote transponders are spaced apart from the vehicle. The remote transponders can be positioned, for example, at a gas station, toll booth, service center, dealership, parking lot, or along a roadside.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
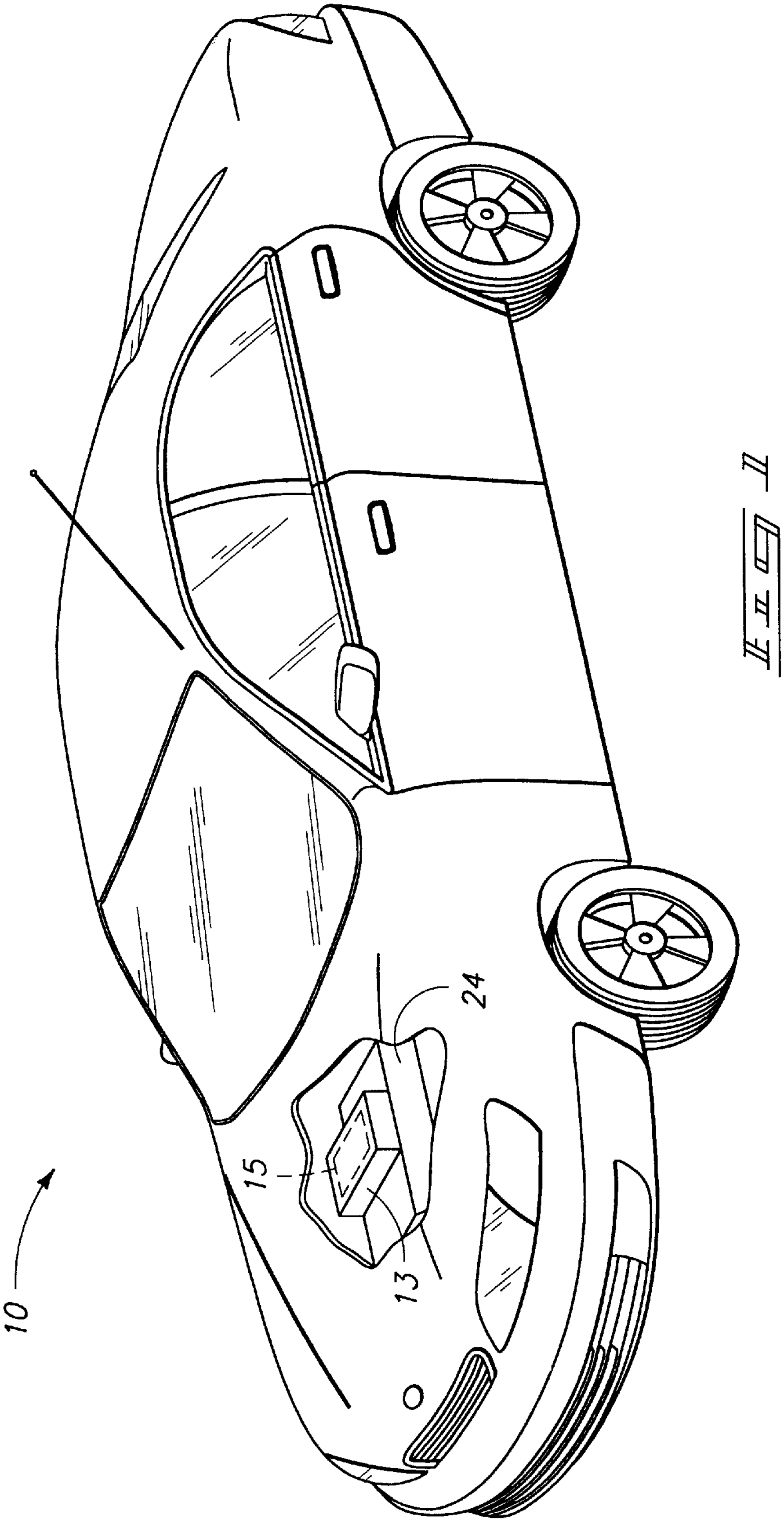
FIG. 1 is a perspective view of a vehicle embodying the invention.
Figure 2:
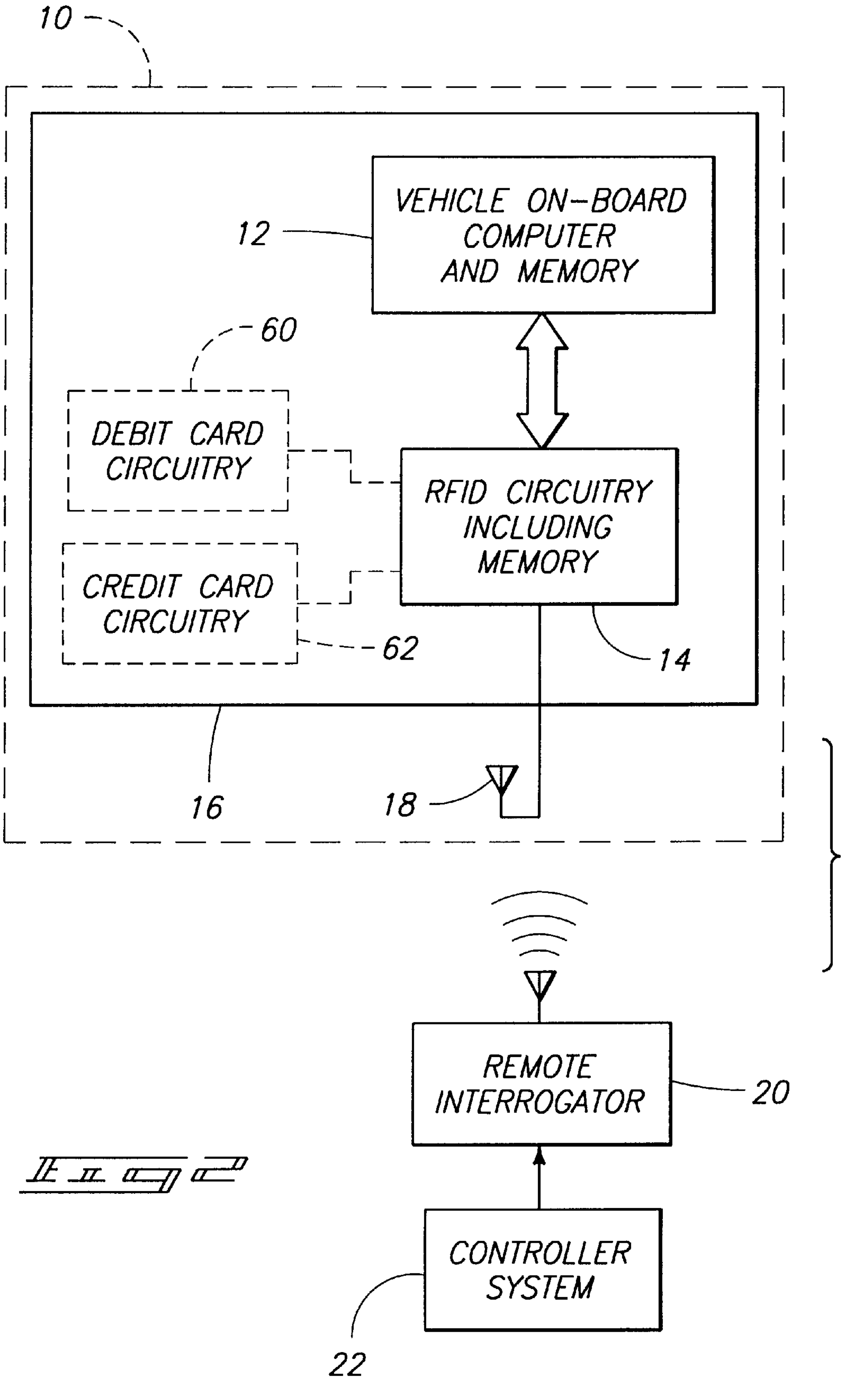
FIG. 2 is a block diagram illustrating a system in accordance with one embodiment of the invention.

This disclosure of the invention is submitted in furtherance of the constitutional purposes of the U.S. Patent Laws "to promote the progress of science and useful arts" (Article 1, Section 8). The figures show a vehicle 10 embodying the invention. The vehicle 10 includes an on-board computer (and memory) 12 in communication with wireless transponder circuitry 14 (FIG. 2). In the illustrated embodiment, the wireless transponder circuitry 14 comprises RFID circuitry including memory. In an alternative embodiment, the wireless transponder circuitry 14 comprises infrared transponder circuitry. One example of a vehicle on-board computer 11 is disclosed in U.S. Pat. No. 4,875,391 to Berra (incorporated by reference). An example of RFID circuitry is disclosed in commonly assigned U.S. patent application Ser. No. 08/705, 043, filed Aug. 29, 1996 (incorporated by reference).

In one embodiment, the RFID circuitry 14 and vehicle on-board computer 12 are provided in a common module or housing 13 that can be easily installed in or removed from a vehicle. Thus, the combination of the is vehicle on-board computer memory 12, and the RFID circuitry including memory 14, can be used to replace existing vehicle on-board computers by swapping modules. The vehicle on-board computer 12, and the RFID circuitry 14 can also be installed as new equipment in new vehicles instead of as a retrofit item. In one embodiment, the RFID circuitry 14 is provided on a common (substantially planar) substrate 15 with the vehicle on-board computer (and memory) 12.

The RFID circuitry 14 includes, in the illustrated embodiment, an integrated circuit having a transmitter, a receiver, a microprocessor, and a memory.

In one embodiment, the RFID circuitry 14 is in serial communication with the vehicle on-board computer and memory 12. More particularly, the RFID circuitry 14 includes a serial data pin. Other forms of communication; e.g., using dual-ported RAM, can be employed. In one embodiment, the vehicle on-board computer and memory 12 is spaced apart in the vehicle from the RFID circuitry 14, and the RFID circuitry communicates with the vehicle on-board computer and memory 12 via a data communications bus such as that described in U.S. Pat. No. 4,853,850 to Krass, Jr. et al. (incorporated by reference), or U.S. Pat. No.

5,459,660 to Berra (incorporated by reference). The combination of the vehicle on-board computer and memory 12 and RFID circuitry 14 define a system 16.

The vehicle 10 further includes an antenna 18 connected to the RFID circuitry 14. The antenna 18 can either be supported by the system 16, or can be located at another location of the vehicle 10, and connected to the RFID circuitry 14 via a cable.

The RFID circuitry 14 communicates with a remote interrogator 20 controlled by a controller system 22.

The system 16 performs a variety of functions because of its ability to transmit and receive data from transponders 20. The transponders 20 may include remote transponders, or one or more transponders in the vehicle, but spaced apart from the system 16. The remote transponders 20 are typically interrogators which are spaced apart from the vehicle. The remote interrogators can be positioned, for example, at a gas station, toll booth, service center, dealership, parking lot, or along a roadside.

In another embodiment, the circuitry 14 defines an interrogator, and the transponders 20 define RFID circuits described in detail in U.S. patent application Ser. No. 08/705,043, and having unique identification codes. Thus, in this embodiment, the location of the interrogators and RFID devices is switched. In one embodiment, the RFID circuitry and an interrogator are both located on the same vehicle for data communications in the vehicle without using a standard data bus or wiring harness.

The system 16 provides for remote communication of the vehicle onboard computer for a variety of purposes.

Figure 3:
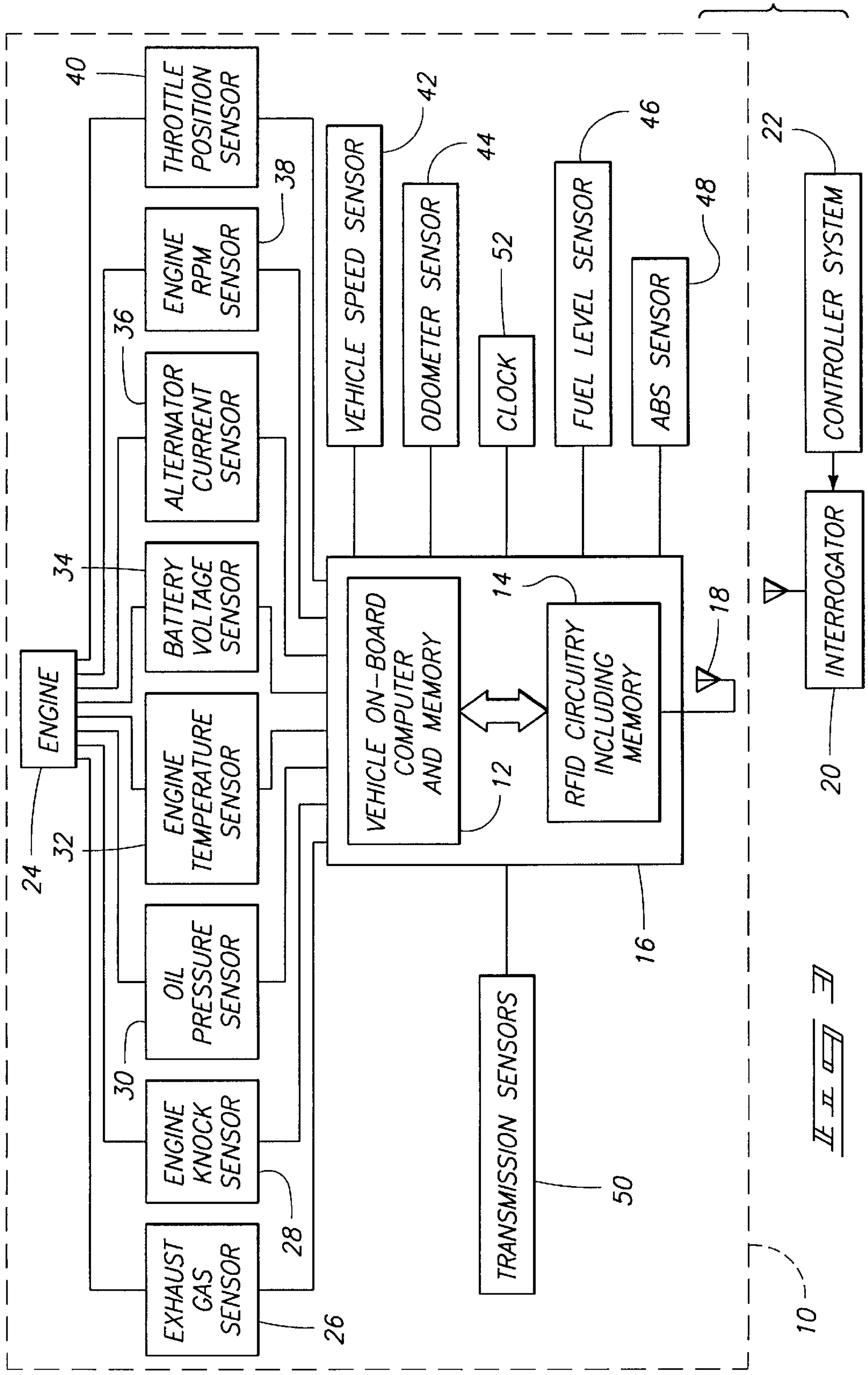
FIG. 3 is a block diagram illustrating a system in accordance with a more particular embodiment of the invention.

For example, telemetry of vehicle performance data can be performed. More particularly, as shown in FIG. 3, the vehicle 10 includes a motor or engine 24, and the system 16 communicates with a plurality of sensors measuring various parameters of the motor 24, or of the vehicle 10 in general. Such sensors are typically read by the vehicle on-board computer 12; however, in alternative embodiments, sensors which are not read by the vehicle on-board computer 12 may be read directly by the RFID circuitry 14.

In one embodiment, the vehicle 10 is an electric vehicle, and the motor 24 is an electric motor. In this embodiment, the vehicle on-board computer 12 performs such functions as controlling power applied to the motor 24 based on angle of inclination of an accelerator actuator, controlling braking, controlling operation of a flywheel that stores mechanical energy on braking, and controlling other functions typically controlled in electric vehicles. For example, in one embodiment, the on-board computer 12 controllably reduces power delivery to the motor during braking, so that braking in response to actuation of a brake pedal is gradual and feels like braking in a more conventional vehicle of the type including an internal combustion engine.

In another embodiment, the motor 24 is an internal combustion engine.

In the embodiment shown in FIG. 3, the sensors include any or all of the following sensors: an exhaust gas sensor 18 (or 02 sensor), an engine knock sensor 28, an oil pressure sensor 30, an engine temperature sensor 32, a battery voltage sensor 34, an alternator current sensor (or charging amps sensor) 36, an engine RPM sensor (or tachometer) 38, an accelerator pedal or throttle position sensor 40, a vehicle speed sensor 42, an odometer sensor 44, a fuel level sensor 46, an ABS braking system sensor 48, transmission sensor 60, a clock 52, and any other sensors typically employed with vehicle on-board computers, or that can be employed with vehicle on-board computers. In one embodiment, the clock 52 is incorporated in the vehicle on-board computer 12 or in the RFID circuitry 14. In one embodiment, the vehicle 10 includes, in communication with the system 16, systems and sensors such as those described in the following patents (all of which are incorporated herein by reference): U.S. Pat. No. 4,168,679 to Ikeura et al; U.S. Pat. No. 4,237,830 to Stivender; U.S. Pat. No. 4,335,695 to Phipps; U.S. Pat. No. 4,524,745 to Tominari et al.; and U.S. Pat. No. 4,552,116 to Kuroiwa et al.

Thus, the system 16 can be used to remotely convey vehicle performance data measured by the sensors. It is now possible, therefore, for a garage or service station to diagnose a problem with the vehicle 10 without needing to physically connect diagnostic equipment to the vehicle 10. It is possible for a garage to begin to diagnose a problem with the vehicle as the vehicle is driven into the service station. In one embodiment, the system 16 includes information identifying the vehicle or the owner of the vehicle. In this embodiment, the garage or service station will know the name of the owner of the vehicle as the owner drives in to the service station, before the owner gets out of the vehicle.

In one embodiment using the system 16, vehicle history is logged in memory (either in the vehicle on-board computer 12, or in the RFID circuitry 14). For example, the vehicle on-board computer can be programmed to periodically store readings from any or all of the various sensors 26, 28, 30, 32, 34, 36, 38, 40, 42, 44, 52, 46, 48, and 50. This information can then be read remotely after the information has been logged.

In one embodiment, the system 16 is used in a rental vehicle facility. In this embodiment a unique code identifying a vehicle is stored in memory in the system 16, and a remote transponder is located at a controlled access point of a rental car return facility. When the vehicle is returned, the remote transponder communicates with the RFID circuitry 14 so as to remotely receive the vehicle identifying data when the vehicle passes the controlled access point. In one embodiment, the remote transponder receives mileage information from the returned vehicle. In another embodiment, the remote transponder receives fuel level information from the returned vehicle. Using such information, a bill can be calculated immediately, reducing human labor needed at car rental facilities. The system 16 can also be used to log, via remote communications with a remote transponder, when a rental vehicle leaves the rental facility (using the unique identification code), so that the start of the rental period can be determined automatically.

Further, information can be transmitted to memory (either in the vehicle on-board computer 12, or in the RFID circuitry 14) remotely. Such information can include vehicle history information including maintenance records, ownership data, purchase price for the vehicle, purchase date of the vehicle, option packages installed at the factory, options added to the vehicle after purchase, warranty records, or other information.

In one embodiment, the system 16 is used as a remote access credit or debit card. This may be particularly convenient for purchasing items associated with vehicles, such as fuel, oil, maintenance, etc., for payment of toll or parking garage payment, or for payment of cellular phone time. In this embodiment, some form of access control is provided to the portion of the memory in the system 16 which contains credits for the debit card. These credits can be incremented remotely, by a remote transponder 20, which possesses a password to gain access to the portion of memory containing the credits for the debit card. Such a password would normally be held, for example, by a bank, or credit union, or other service provider which accepts the debit card. In this embodiment, the system 16 is programmed to operate as a conventional debit card, except that payment can be made remotely using the RFID circuitry 14. After payment is made, by reducing the credit balance in the memory, the RFID circuitry 14 indicates to the remote transponder 20 seeking payment that payment has been made.

The system 16 can also be used as a credit card (such as a oil company/gasoline credit cards or a bank-issued credit card). In this embodiment, credit card account information, including a credit card number is stored in the memory of the system 16 and is transmitted by the RFID circuitry 14 to a transponder 20 to make a payment. Other information that may be stored and transmitted include expiration date, cardholder name, zip code, cardholder billing address, bank name, bank phone number, etc. If the system 16 is being used as a credit card, payment history or purchase history may be stored in the memory of the system 16.

If the system 16 is used as a debit card, the appropriate programming and access control defines debit card circuitry 60. If the system 16 is used as a credit card, the account number information and programming defines credit card circuitry 62.

Figure 4:
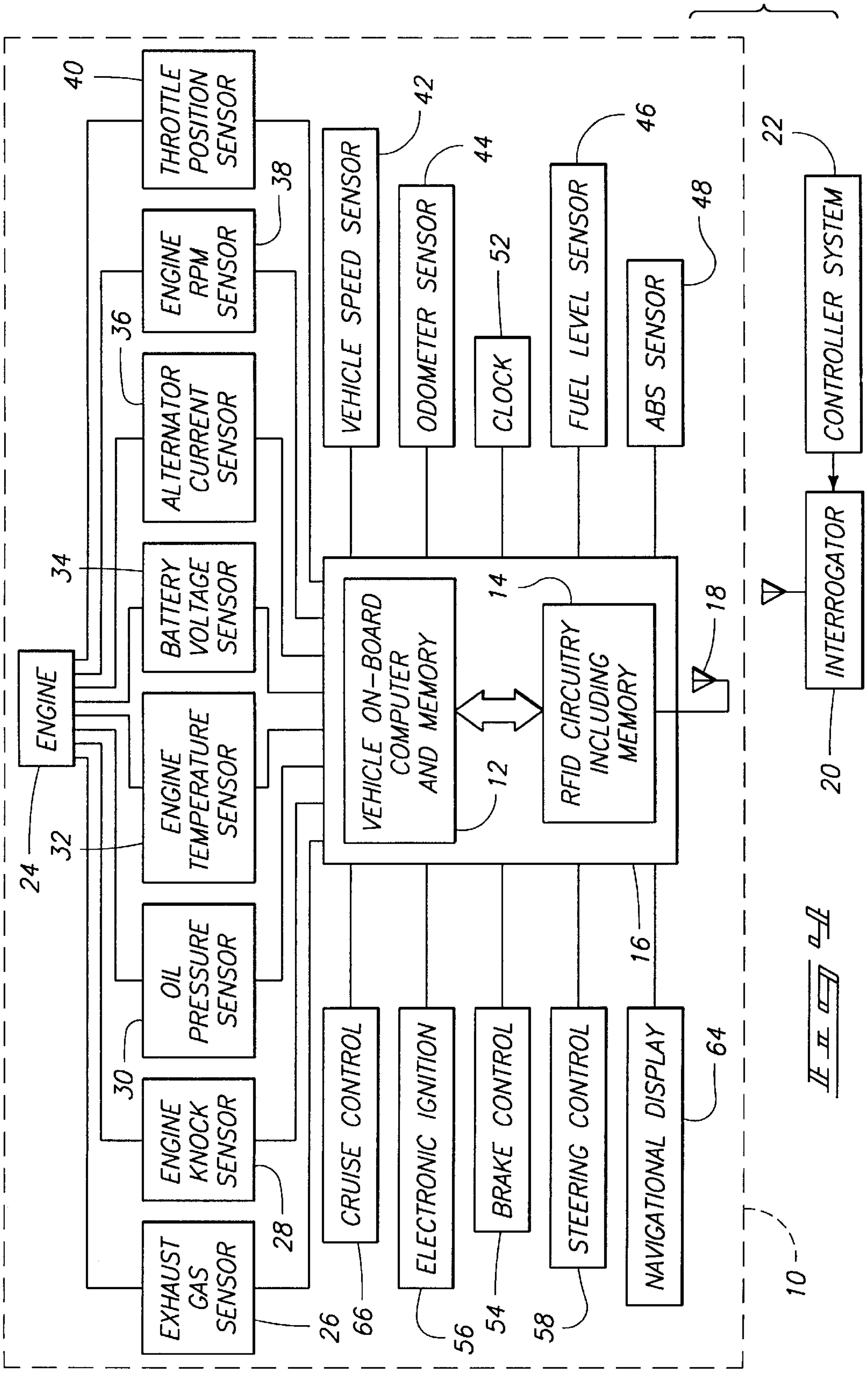
FIG. 4 is a block diagram illustrating a system in accordance with an alternative embodiment of the invention.

The system 16 is also used, in one embodiment, as an intelligent roadside communications link for intelligent highway applications, or intelligent transportation systems. For example, if the vehicle 10 approaches a stop sign having a transponder 20, the RFID circuitry 14 will recognize that the vehicle is approaching a stop sign, and will sound an alarm in the vehicle 10, or may effect application of the brakes of the vehicle or reduction in vehicle speed. In this embodiment, the vehicle 10 includes a brake control system 54 (FIG. 4) that selectively applies the brakes in response to an appropriate command from a transponder 20. In one embodiment, where the vehicle 10 includes an internal combustion engine, the vehicle 10 includes an electronic ignition system 56 that selectively reduces vehicle speed in response to an appropriate command from a transponder 20. In another embodiment, where the vehicle 10 is an electric vehicle, the vehicle includes a braking system (as described above) that selectively reduces vehicle speed in response to an appropriate command from a transponder 20 (such as by reducing power applied to the electric motor, or by transferring mechanical energy to a flywheel).

In one embodiment, the system 16 uses signal strength to determine vehicle distance relative to the transponder 20. This information is used, in one embodiment, to determine whether to merely reduce engine speed, or to apply brakes. In one embodiment, distance is used by the system to determine what level of braking should be employed, and this information is used to appropriately control the brake control system 54.

In one embodiment, the RFID circuitry 14 transmits the speed of the vehicle for monitoring by police. In an alternative embodiment, a transponder 20 transmits a signal warning of dangerous road conditions, such as fog, flooding, or an accident ahead, which signal is received by the RFID circuitry 14, and causes the vehicle on-board computer 12 to reduce the speed of the engine or limit the speed of the vehicle or limit the RPM of the engine or downshift the transmission, overriding user actuable controls (e.g. accelerator), etc. In this embodiment, the speed of the vehicle 10 is controlled by the electronic ignition 56 (for vehicles with internal combustion engines), by a motor control system (for electric vehicles), or the vehicle 10 includes a cruise control system 66 controlling the speed of the vehicle 10.

In another embodiment, speed limit signs include transponders 20 transmitting a signal indicative of maximum speed for the road or highway, which signals are received by th e RFID circuitry 14, and communicated to the vehicle on-board computer and memory 12, which limits vehicle speed to the received speed limit. Alternatively, the vehicle includes an actuator allowing the driver to set a vehicle speed relative to the speed received by the speed limit transponder.

Two tiered speed transponders can also be employed, including transponders transmitting a recommended speed (e.g., around curves, etc.), and other transponders transmitting speed limit information. In this embodiment, the vehicle include s actuators for selecting controlling vehicle speed relative to one or the other type of speed transponders 20.

In another embodiment, transponders 20 are positioned along a road way, and the system 16 uses these signals to determine its position and to maintain the vehicle within certain bounds; e.g., if the driver falls asleep at the wheel, or desires to relinquish steering control. In this embodiment, the vehicle 10 includes a steering control system 58 which controls steering of the vehicle. In one embodiment, the system is a safety system which overrides the user actuable control (e.g. steering wheel) when the system 16 determines that the vehicle is about to go off the road. Such a steering control system can be turned on or off by the user. For example, the user (driver) selectively turns on the steering control system 58 upon entering a highway, and turns off the steering control system 58 if he or she desires to leave the highway or to pull off the road. The steering control system 58 can also be used for completely automated steering of a passenger vehicle, receiving signals from the transponders 20 along the road to guide the vehicle 10. Such a system may be similar to the system described in U.S. Pat. No. 5,189,612 (incorporated herein by reference) except that radio frequency transponders are employed instead of buried magnetic markers. In one embodiment, the vehicle may be a remotely controlled tractor or robot vehicle as opposed to a passenger vehicle.

Using a transponder 20, information from external sources can be transferred to the system 16 for various applications. In one embodiment, information is transferred to the system 16 for such applications as remote service adjustments of the engine 24, e.g., by adjusting the electronic ignition 56. In one embodiment, a transponder 20 is used for remote loading of debit card data or credits. In one embodiment, a transponder 20 is used for remote control of the brakes or steering (as described above). In one embodiment, a transponder 20 is used to transfer travel information to the vehicle (e.g., indicating what services are available at the next exit, indicating distances to various points, etc.).

In one embodiment, navigational maps or data from maps are transmitted to the system 16 by a remote transponder 20 at various locations (e.g., upon entering a state or city). In such embodiments, the vehicle 10 includes a navigational display 64 displaying maps selected by the user or driver including maps of the particular area in which the user or driver is presently driving, and plotting items such as gasoline stations, motels, restaurants, or other providers of goods or services. The system 16, if requested, determines which map to display, determines where the vehicle 10 is located, and plots the location of the vehicle on a map or choose an appropriate map for the location of the vehicle.

More particularly, in one embodiment, transponders 20 each have their own identification codes, and the RFID circuitry 14 determines where the vehicle 10 is located (e.g., using triangulation) based on when the RFID circuitry 14 communicated with one or more particular transponders, the location of those transponders, and the speed of the vehicle 10 as read by the speed sensor (and, in one embodiment, based on signal strength or rate of change of signal strength).

Similarly, state agencies or friends or relatives can determine the position of a particular vehicle 10.

More particularly, different vehicles 10 include different unique identification codes stored in the system 16, and these identification code are transmitted to transponders 20 as the vehicles pass within communications range of these transponders 20. A system external to the vehicle can determine (e.g., using triangulation) the location of the vehicle based on when a particular vehicle's system 16 communicated with particular transponders 20, the location of those transponders 20, and the speed of the vehicle as read by the speed sensor 42 (and, in one embodiment, based on signal strength or rate of change of signal strength).

This unique identification code can also be used for other purposes, such as for informing garages or maintenance facilities of the name of the vehicle owner as the vehicle pulls into the maintenance facility. The unique identification code can also be used in toll systems, parking lots, or other pay systems in which the system 16 does not act as a debit card. More particularly, a transponder at a toll booth, parking lot, etc., reads the unique identification code and debits an account associated with that particular identification code.

Various other applications for the system 16 will readily be apparent to those of ordinary skill in the art.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A system for telemetry of vehicle performance data, the system comprising:

a vehicle on-board computer system including a first microprocessor;

a radio frequency transponder in communication with the on-board computer system, the radio frequency transponder including an integrated circuit having a transmitter, a receiver, and a second microprocessor, and a common housing enclosing both the vehicle on-board computer system and the radio frequency transponder, the housing being sized for insertion in a vehicle engine compartment.

2. A system for telemetry of vehicle performance data in accordance with claim 1 and further comprising a sensor coupled to the vehicle on-board computer, wherein the radio frequency transponder is configured to transmit information measured by the sensor in response to a radio frequency interrogation by an interrogator.

3. A system for telemetry of vehicle performance data in accordance with claim 2 wherein the sensor is an oil pressure sensor.

4. A system for telemetry of vehicle performance data in accordance with claim 2 wherein the sensor is an engine knock sensor.

5. A system for telemetry of vehicle performance data in accordance with claim 2 wherein the sensor is an engine temperature sensor.

6. A system for telemetry of vehicle performance data in accordance with claim 2 wherein the sensor is an exhaust gas sensor.

7. A system for telemetry of vehicle performance data in accordance with claim 2 wherein the sensor is a battery voltage sensor.

8. A system for telemetry of vehicle performance data in accordance with claim 2 wherein the sensor is an alternator current sensor.

9. A system for telemetry of vehicle performance data in accordance with claim 2 wherein the sensor is an engine RPM sensor.

10. A vehicle system capable of communicating with radio frequency interrogators provided along a road or highway, the system comprising:

a vehicle on-board computer; and a radio frequency identification device in communication with the vehicle on-board computer, the radio frequency identification device including an integrated circuit having a memory, a transmitter, a receiver, and a microprocessor and configured to provide an identification code;

wherein the radio frequency identification device transmits the identification code to interrogators that the system passes.

11. A system for telemetry of vehicle performance data in a vehicle including an internal combustion engine the system comprising:

an oil pressure sensor configured to sense the oil pressure in the internal combustion engine;

a vehicle on-board computer;

a radio frequency transponder in communication with the vehicle on-board computer, the radio frequency transponder including an integrated circuit having a transmitter, a receiver, and a microprocessor coupled to the transmitter and receiver;

an engine temperature sensor configured to measure the temperature of the engine; and a battery voltage sensor, wherein the radio frequency transponder is configured to transmit information measured by a selected one of the sensors by radio frequency transmission in response to a radio frequency interrogation by an interrogator and depending on what information is requested by the interrogator.

12. A system for telemetry of vehicle performance data, the system comprising:

a vehicle on-board computer system;

a radio frequency identification device in communication with the on-board computer system, the radio frequency identification device including an integrated circuit having a transmitter, a receiver, and a microprocessor;

an oil pressure sensor, the oil pressure sensor being in communication with the on-board computer system and configured to communicate oil pressure to the on-board computer system, the radio frequency identification device transmitting the data communicated to the on-board computer system in response to a radio frequency interrogation being received by the radio frequency identification device from an interrogator;

an engine temperature sensor, the engine temperature sensor being in communication with the on-board computer system and configured to communicate the temperature of the engine to the on-board computer system; and a battery voltage sensor, wherein the radio frequency transponder transmits information measured by a selected one of the sensors by radio frequency in response to a radio frequency interrogation by an interrogator and depending on what information is requested by the interrogator.

13. A vehicle system comprising:

a vehicle on-board computer;

a radio frequency identification device in communication with the vehicle on-board computer, the radio frequency identification device including an integrated circuit having a memory, a transmitter, a receiver, and a microprocessor and configured to provide an identification code; and a plurality of radio frequency interrogators provided along a road or highway, respectively configured to communicate with the radio frequency identification device, and respectively having a communications range;

wherein the radio frequency identification device is configured to transmit the identification code to ones of the interrogators for which the radio frequency identification device comes within communications range.

14. A method of logging vehicle history, the method comprising:

providing a memory in a vehicle;

connecting a wireless communication device to a vehicle on-board computer of the vehicle, the wireless communication device including an integrated circuit having a transmitter, a receiver and a microprocessor;

periodically storing information from the vehicle on-board computer in the memory; and communicating with the wireless communication device and reading from the memory at a location spaced apart from the vehicle.

15. A method of logging vehicle history, the method comprising:

supporting a memory in a vehicle, the vehicle having a transmission;

coupling a wireless communication device to a vehicle on-board computer of the vehicle, the wireless communication device including an integrated circuit having a transmitter, a receiver, and a microprocessor coupled to the transmitter, receiver, and memory;

periodically storing information representative of transmission performance in the memory; and communicating with the wireless communication device and reading the data representative of transmission performance from the memory at a location spaced apart from the vehicle.

16. A method in accordance with claim 15 and further comprising storing data representative of engine performance in the memory and selectively reading the data representative of transmission performance from the memory via wireless communications.

17. A method in accordance with claim 15 and further comprising storing a vehicle maintenance record in the memory and selectively reading the vehicle maintenance record from the memory via wireless communications.

18. A method in accordance with claim 15 and further comprising storing information identifying the owner of the vehicle in the memory and selectively reading the information identifying the owner from the memory via wireless communications.

19. A method in accordance with claim 15 and further comprising storing information indicative of the purchase price of the vehicle in the memory and selectively reading the information indicative of purchase price from the memory via wireless communications.

20. A method in accordance with claim 15 and further comprising storing information indicative of the purchase date of the vehicle in the memory and selectively reading the information indicative of purchase price from the memory via wireless communications.

21. A method in accordance with claim 15 and further comprising storing information indicative of vehicle installed options in the memory and selectively reading the information indicative of vehicle installed options from the memory via wireless communications.

22. A method in accordance with claim 15 and further comprising storing information indicative of repairs made to the vehicle and selectively reading the information indicative of repairs from the memory via wireless communications.

23. A method of logging data from rental vehicles, the method comprising:

providing a system including a radio frequency transponder device, and a vehicle on-board computer in a rental vehicle, the radio frequency transponder device including an integrated circuit having a memory configured to store data identifying the vehicle and having a microprocessor coupled to the memory;

providing a mileage sensor in the rental vehicle, in communication with the radio frequency transponder device, the mileage sensor being configured to generate mileage information;

locating a remote transponder at a controlled access point of a rental vehicle facility; and causing the remote transponder to communicate with the radio frequency transponder device so as to receive via wireless communications the identifying data and mileage information when the vehicle passes the controlled access point and thereby determine that the vehicle has passed the controlled access point.

24. A method in accordance with claim 23 and further comprising providing an additional sensor in communication with the radio frequency transponder device, and causing the remote transponder to communicate with the radio frequency transponder device so as to receive via wireless communications data sensed by the additional sensor when the vehicle passes the controlled access point.

25. A method in accordance with claim 24 wherein the additional sensor is a fuel level sensor.

26. A method in accordance with claim 24 wherein the additional sensor is an oil pressure sensor.

27. A method in accordance with claim 24 wherein the additional sensor is an engine knock sensor.

28. A method in accordance with claim 24 wherein the additional sensor is an engine temperature sensor.

29. A method in accordance with claim 24 wherein the additional sensor is an exhaust gas sensor.

30. A method in accordance with claim 24 wherein the additional sensor is a battery voltage sensor.

31. A method in accordance with claim 24 wherein the additional sensor is an alternator current sensor.

* * * * *

UNITED STATES PATENT AND TRADEMARK OFFICE
CERTIFICATE OF CORRECTION

PATENT NO : 5,995,898
DATED : November 30, 1999
INVENTOR(S) : John R. Tuttle

It is certified that error appears in the above-identified patent and that said Letters Patent are hereby corrected as shown below:

Col. 2, line 36
replace "computer 11"
with --computer --

Col. 2, line 45
replace "combination of the is vehicle"
with --combination of the vehicle--.

Col. 6, line 7
replace "th e"
with --the--.

Col. 6, line 17
replace "include s"
with --includes--.

Signed and Sealed this

Twenty-fourth Day of October, 2000

Attest:

Q. TODD DICKINSON

Attesting Officer

Director of Patents and Trademarks